(12) United States Patent
Yun et al.

(10) Patent No.: US 12,463,538 B2
(45) Date of Patent: Nov. 4, 2025

(54) DC-TO-DC CONVERTER WITH PULSE SKIPPING FUNCTION AND ON-TIME CONTROL FUNCTION, AND ELECTRONIC DEVICES INCLUDING THE SAME

(71) Applicant: Samsung Electronics Co., Ltd., Suwon-si (KR)

(72) Inventors: Dam Yun, Suwon-si (KR); Jaekyu Kim, Suwon-si (KR); Jehyung Yoon, Suwon-si (KR); Sangik Cho, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 383 days.

(21) Appl. No.: 18/151,115

(22) Filed: Jan. 6, 2023

(65) Prior Publication Data

US 2023/0327548 A1 Oct. 12, 2023

(30) Foreign Application Priority Data

Apr. 8, 2022 (KR) ................ 10-2022-0044196

(51) Int. Cl.
*H02M 3/157* (2006.01)
*H02M 1/00* (2006.01)
*H02M 1/08* (2006.01)

(52) U.S. Cl.
CPC ......... *H02M 3/157* (2013.01); *H02M 1/0009* (2021.05); *H02M 1/083* (2013.01)

(58) Field of Classification Search
CPC ...... H02M 3/156; H02M 3/157; H02M 3/158; H02M 1/0009; H02M 1/083; H02M 1/0035; H02M 1/0058; H02M 1/0054; H02M 1/08; H02M 1/14; H02M 1/32; H02M 1/0025; H02M 1/0029
See application file for complete search history.

(56) References Cited

U.S. PATENT DOCUMENTS 7,528,590 B2 5/2009 Wei
7,679,133 B2 3/2010 Son et al.
(Continued)

FOREIGN PATENT DOCUMENTS

KR 10-0802918 B1 2/2008
KR 10-2021-0097534 A 8/2021

*Primary Examiner* — Monica Lewis
*Assistant Examiner* — Jye-June Lee
(74) *Attorney, Agent, or Firm* — Harness, Dickey & Pierce, P.L.C.

(57) ABSTRACT

Disclosed is a DC-to-DC converter which includes a first switching circuit connected between a power line receiving a DC voltage and an output terminal of the DC-to-DC converter and switched based on a first pulse control signal, a second switching circuit connected between the output terminal and a ground and switched based on a second pulse control signal, a pulse control signal generation circuit that receives a first level of a first voltage associated with an output voltage and a second level of a first reference voltage, wherein, in response to the second level being higher than the first level, the pulse control signal generation circuit is configured to generate the first pulse control signal to increase the output voltage and wherein, in response to the second level being lower than the first level, the pulse control signal generation circuit is configured to generate the second pulse control signal.

20 Claims, 12 Drawing Sheets

(56) References Cited

U.S. PATENT DOCUMENTS

| | | |
|---|---|---|
| 8,553,466 B2 | 10/2013 | Han et al. |
| 8,559,235 B2 | 10/2013 | Yoon et al. |
| 8,654,587 B2 | 2/2014 | Yoon et al. |
| 8,842,225 B2 | 9/2014 | Murakami et al. |
| 8,872,497 B2 | 10/2014 | Nakashima |
| 9,058,043 B2 | 6/2015 | Lin et al. |
| 9,374,007 B2 | 6/2016 | Shiina et al. |
| 9,455,626 B2 | 9/2016 | Xue et al. |
| 9,602,001 B1 * | 3/2017 | Hung ................ H02M 3/158 |
| 9,641,076 B2 | 5/2017 | Kudo et al. |
| 9,647,541 B2 | 5/2017 | Fan |
| 9,768,695 B2 | 9/2017 | Nomiyama et al. |
| 9,882,485 B2 | 1/2018 | Trichy et al. |
| 10,218,274 B1 | 2/2019 | Chan |
| 10,965,215 B2 | 3/2021 | Talari et al. |
| 11,177,730 B2 | 11/2021 | Chen et al. |
| 2006/0268974 A1 * | 11/2006 | Chu .................. H02M 3/156 375/238 |
| 2008/0174286 A1 * | 7/2008 | Chu .................. H02M 3/1588 323/271 |
| 2011/0233648 A1 | 9/2011 | Seol et al. |
| 2012/0212195 A1 * | 8/2012 | Kushida ............. H02M 3/1588 323/271 |
| 2012/0274296 A1 | 11/2012 | Higuchi et al. |
| 2013/0249508 A1 * | 9/2013 | Rahimi ............... H02M 3/156 323/271 |
| 2014/0043005 A1 * | 2/2014 | Ide .................... H02M 1/32 323/285 |
| 2014/0152285 A1 | 6/2014 | Rozek |
| 2014/0160601 A1 * | 6/2014 | Ouyang ............. H02M 3/1588 361/18 |
| 2015/0188433 A1 * | 7/2015 | Jiang ................. H02M 3/156 323/271 |
| 2017/0237350 A1 | 8/2017 | Kawano et al. |
| 2017/0288537 A1 | 10/2017 | Jing et al. |
| 2018/0351457 A1 * | 12/2018 | Ripley .............. H02M 3/1582 |
| 2021/0028700 A1 | 1/2021 | Cuenca et al. |
| 2021/0203230 A1 | 7/2021 | Li |
| 2021/0242774 A1 | 8/2021 | Yun et al. |
| 2021/0242778 A1 | 8/2021 | Ruan et al. |
| 2021/0305899 A1 * | 9/2021 | Hsieh ................ H02M 1/0035 |

* cited by examiner

DC-TO-DC CONVERTER WITH PULSE SKIPPING FUNCTION AND ON-TIME CONTROL FUNCTION, AND ELECTRONIC DEVICES INCLUDING THE SAME

CROSS-REFERENCE TO RELATED APPLICATIONS

This application claims priority under 35 U.S.C. § 119 to Korean Patent Application No. 10-2022-0044196 filed on Apr. 8, 2022, in the Korean Intellectual Property Office, the disclosure of which is incorporated by reference herein in its entirety.

BACKGROUND

An electronic product that is connected to an outlet to operate may use an AC-to-DC converter that converts an AC voltage into a DC voltage. Because most semiconductor components operate based on the DC voltage, the semiconductor components normally include the AC-to-DC converter.

Integrated circuits mounted on a board have unique operating voltage ranges, and voltage precisions that the integrated circuits use are different.

When an unstable voltage is supplied to an integrated circuit, the integrated circuit may operate abnormally or may suffer from the degradation of characteristics. Accordingly, a DC-to-DC converter is used to supply a voltage used by the integrated circuit or to stabilize the voltage supplied to the integrated circuit.

The DC-to-DC converter is an electronic circuit or electromechanical device that converts a DC source from one voltage level to another voltage level. The DC-to-DC converter is an example of an electric power converter.

The DC-to-DC converter is mainly used in portable electronic devices, which are powered by a battery, such as a mobile phone and a laptop computer. The portable electronic device includes a plurality of sub-circuits, each of which often uses a voltage level higher or lower than a level of a supply voltage supplied from a battery or an external voltage supply device.

SUMMARY

Example embodiments of the present disclosure provide a DC-DC converter capable of reducing the overshoot by stabilizing mode switching in a heavy-load-to-light-load transient situation through the adaptive and stable pulse skip variable control and capable of optimizing or improving the efficiency and ripple voltage according to a load current flowing through a load by variably adjusting an on-time based on the load current and electronic devices including the same.

According to an example embodiment, a DC-to-DC converter includes a first switching circuit that is connected between a power line receiving a DC voltage and an output terminal of the DC-to-DC converter and the first switching circuit configured to be switched based on a first pulse control signal, a second switching circuit that is connected between the output terminal and a ground and the second switching circuit is switched based on a second pulse control signal, a pulse control signal generation circuit that receive a first level of a first voltage associated with an output voltage and a second level of a first reference voltage, wherein, in response to the second level being higher than the first level, the pulse control signal generation circuit is configured to generate the first pulse control signal to increase the output voltage and wherein, in response to the second level being lower than the first level, the pulse control signal generation circuit is configured to generate the second pulse control signal to decrease the output voltage, and a pulse skip control circuit. The pulse skip control circuit is configured to determine whether to transfer the second pulse control signal to the second switching circuit, based on a zero current detection signal and a pulse skip mode control signal, and the first pulse control signal and the second pulse control signal are complementary signals.

According to an example embodiment, an electronic device includes a power management integrated circuit that includes a DC-to-DC converter including an output terminal and a feedback voltage terminal, a load that filters an output voltage output from the output terminal and generates a filtered voltage, and a device that is powered by the filtered voltage. The DC-to-DC converter includes a first switching circuit that is connected between a power line receiving a DC voltage and the output terminal and the first switching circuit configured to be switched based on a first pulse control signal, a second switching circuit that is connected between the output terminal and a ground and the second switching circuit is configured to be switched based on a second pulse control signal, a pulse control signal generation circuit that receive a first level of a first voltage associated with the output voltage and a second level of a first reference voltage, wherein, in response to the second level being higher than the first level, the pulse control signal generation circuit is configured to generate the first pulse control signal to increase the output voltage and wherein, in response to the second level being lower than the first level, the pulse control signal generation circuit is configured to generate the second pulse control signal to decrease the output voltage, and a pulse skip control circuit. Even though the second level is lower than the first level, the pulse skip control circuit is configured to determine whether to transfer the second pulse control signal to the second switching circuit, based on a zero current detection signal and a pulse skip mode control signal, and the first pulse control signal and the second pulse control signal are complementary signals.

According to an example embodiment, an operating method of a DC-to-DC converter which includes a first switching circuit connected between a power line receiving a DC voltage and an output terminal and switched based on a first pulse control signal and a second switching circuit connected between the output terminal and a ground and switched based on a second pulse control signal includes generating the first pulse control signal for increasing the output voltage in response to a first voltage associated with an output voltage of the output terminal being smaller than a first reference voltage, generating the second pulse control signal for decreasing the output voltage in response to the first voltage being greater than the first reference voltage, and determining whether to transfer the second pulse control signal to the second switching circuit based on a zero current detection signal, and a pulse skip mode control signal, and the first pulse control signal and the second pulse control signal are complementary signals.

BRIEF DESCRIPTION OF THE FIGURES

The above and other objects and features of the present disclosure will become apparent by describing in detail in example embodiments thereof with reference to the accompanying drawings.

DETAILED DESCRIPTION

Figure 1:
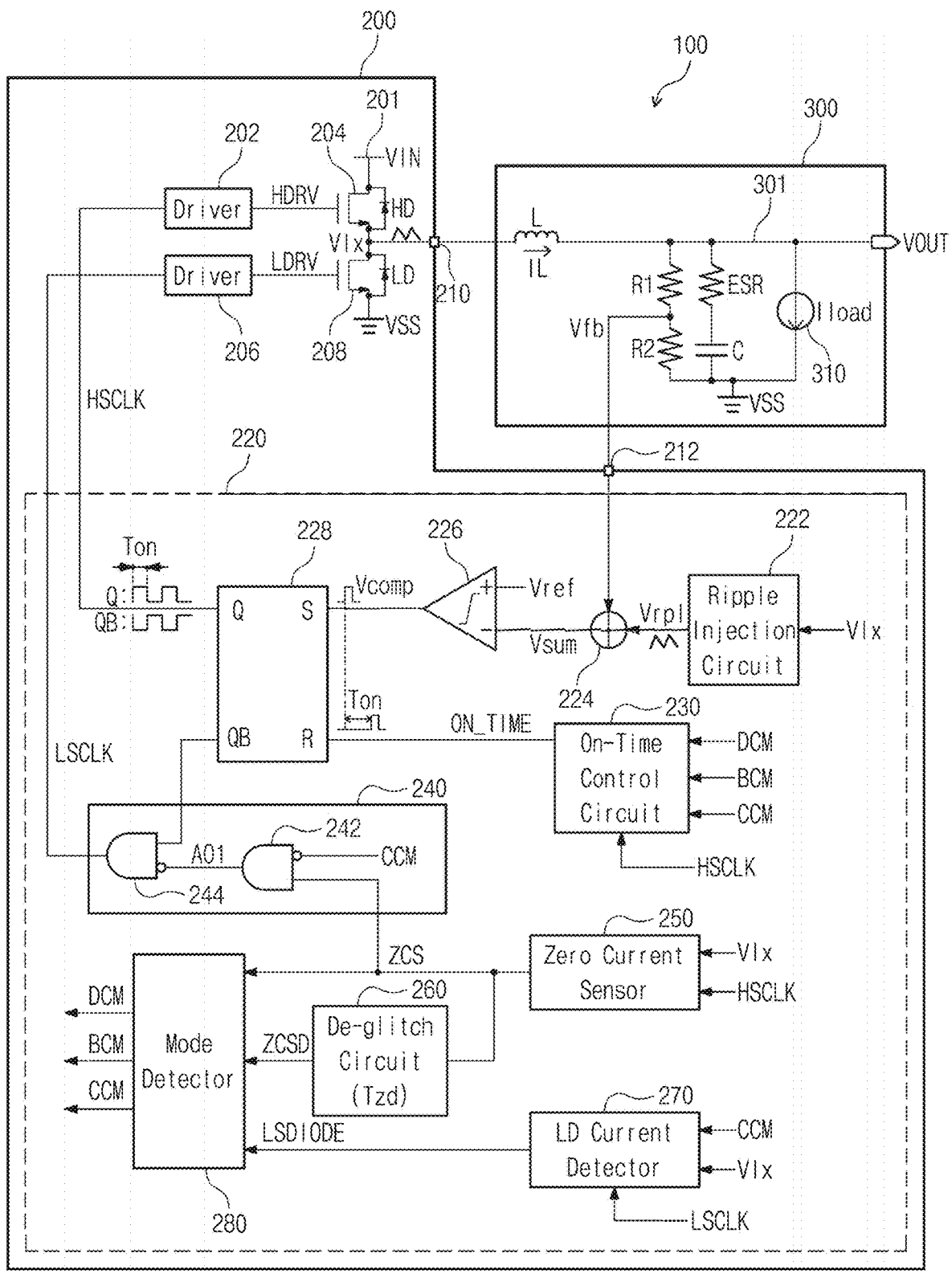
FIG. 1 is a block diagram illustrating an electronic device including a DC-to-DC converter providing a pulse skip function and an on-time control function, according to some example embodiments of the present disclosure.

FIG. 1 is a block diagram illustrating an electronic device including a DC-to-DC converter providing a pulse skip function and an on-time control function, according to some example embodiments of the present disclosure.

Referring to FIG. 1, an electronic device 100 includes a DC-to-DC converter 200 and a load 300.

The electronic device 100 is a mobile device, a personal computer (PC), or a solid state drive for server, and examples of the mobile device include a smartphone, a tablet computer, an E-book reader, a wearable computer, a mobile Internet device (MID), a digital media play, a digital camera, a smart watch, etc.

Examples of the DC-to-DC converter 200 include a buck converter or a buck-boost converter. According to some example embodiments, the DC-to-DC converter 200 may be implemented with an independent DC-to-DC converter or may be integrated in a power management integrated circuit (PMIC). The PMIC may be integrated on a semiconductor substrate.

Figure 11:
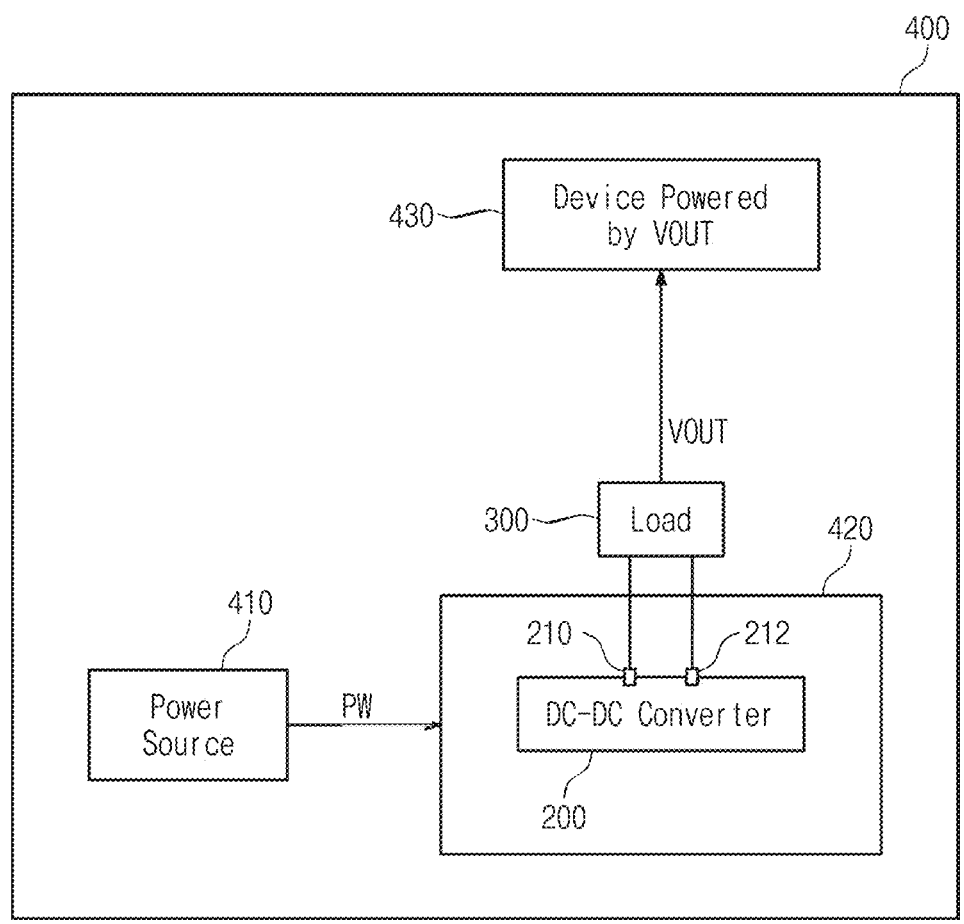
FIG. 11 is a block diagram illustrating an electronic device including a DC-to-DC converter providing a pulse skip function and an on-time control function, according to some example embodiments of the present disclosure.
Figure 12:
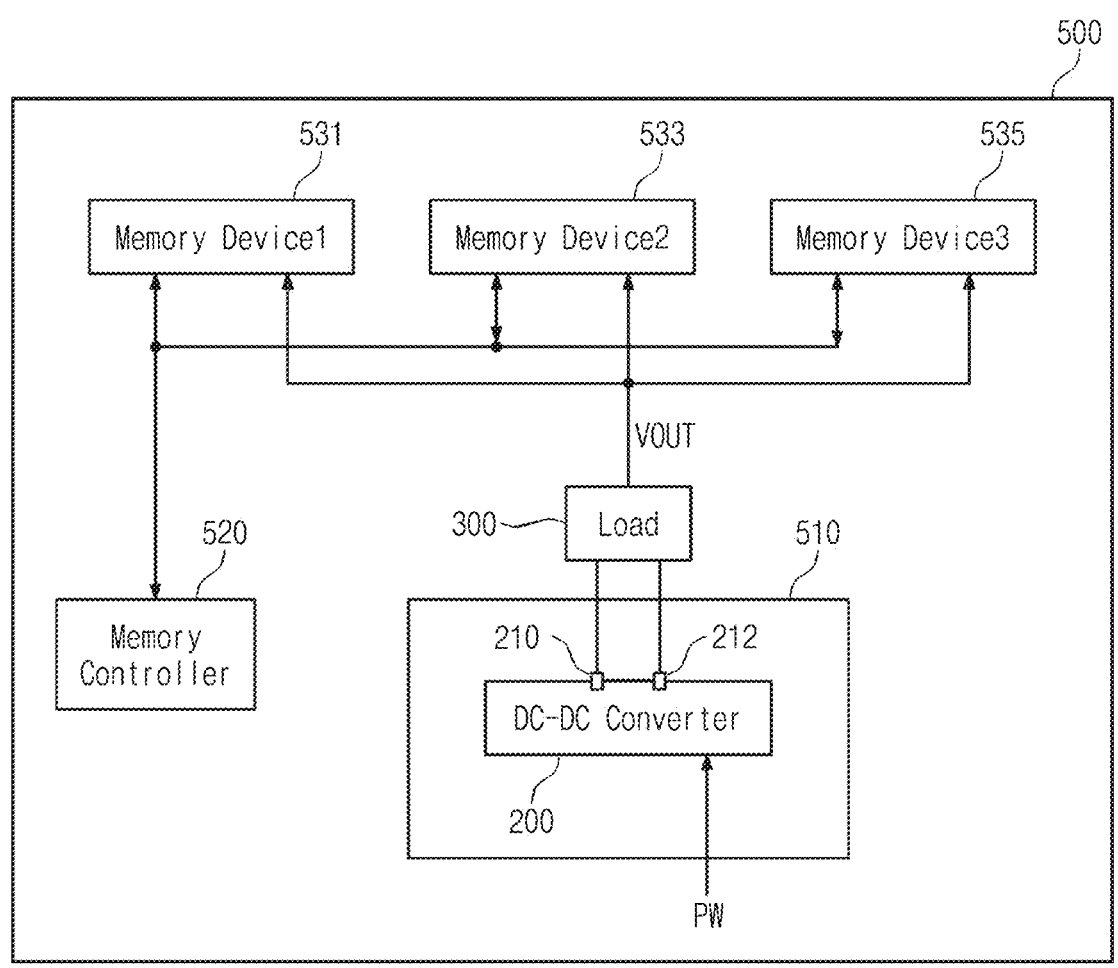
FIG. 12 is a block diagram illustrating an electronic device including a DC-to-DC converter providing a pulse skip function and an on-time control function, according to some example embodiments of the present disclosure.

An output voltage VOUT of the load 300 that regulates an output voltage VIx of the DC-to-DC converter 200 may be supplied to a device (e.g., a system on Chip (SoC)) illustrated in FIG. 11 or a device (e.g., a volatile memory device such as a DRAM or a nonvolatile memory device such as a flash memory device) illustrated in FIG. 12. The load 300 includes a function of filtering the output voltage VIx of the DC-to-DC converter 200 and a function of rectifying the output voltage VIx, in spite of its name.

The DC-to-DC converter 200 includes a first switching circuit called a high-side switching circuit, a second switching circuit called a low-side switching circuit, and a control circuit 220.

The first switching circuit includes a first driver 202, a first power transistor 204 called a high-side power transistor, and a first diode HD called a high-side diode. The first switching circuit performs a function of a pull-up circuit that increases the output voltage VIx of an output terminal 210 in response to a first pulse control signal HSCLK.

The first driver 202 amplifies the first pulse control signal HSCLK to generate a first gate control signal HDRV.

The first power transistor 204 is connected between a power line 201 receiving a DC voltage VIN and the output terminal 210 and increases the output voltage VIx of the output terminal 210 in response to the first gate control signal HDRV. The DC voltage VIN may be an output voltage of a DC power source, for example, a battery or a voltage regulator.

The first diode HD is connected between a source and a drain of the first power transistor 204.

The second switching circuit includes a second driver 206, a second power transistor 208 called a low-side power transistor, and a second diode LD called a low-side diode. The second switching circuit performs a function of a pull-down circuit that decreases the output voltage VIx of the output terminal 210 in response to a second pulse control signal LSCLK.

The second driver 206 amplifies the second pulse control signal LSCLK to generate a second gate control signal LDRV. For example, when a pulse skip mode control signal CCM is at a high level, the first driver 202 and the second driver 206 are designed such that the power transistors 204 and 208 are not simultaneously turned on or turned off.

The second power transistor 208 is connected between the output terminal 210 and a ground VSS and may decrease the output voltage VIx of the output terminal 210 in response to the second gate control signal LDRV. Each of the power transistors 204 and 208 may be implemented with an NMOS transistor.

The second diode LD is connected between a source and a drain of the second power transistor 208.

The control circuit 220 controls a pulse skip operation and an on-time control operation with regard to the power transistors 204 and 208. The control circuit 220 indirectly monitors a change in a load current Iload by using the output voltage VIx, adaptively adjusts an on-time Ton based on a monitoring result, and controls a pulse skip mode based on the pulse skip mode control signal CCM and a zero current detection signal ZCS generated based on a result of comparing a level of the output voltage VIx and a ground voltage.

The control circuit 220 includes a ripple injection circuit (or an emulator) 222, an adder circuit 224, a first comparator 226, an SR latch 228, an on-time control circuit 230, a pulse skip control circuit 240, a zero current sensor 250, a de-glitch circuit 260, a diode current detector 270, and a mode detector 280.

The ripple injection circuit 222 emulates an inductor current IL flowing through an inductor "L" of the load 300 by using the output voltage VIx and generates an emulation voltage Vrpl in which a ripple is included.

The adder circuit 224 generates a first voltage Vsum by summing a feedback voltage Vfb input through a feedback voltage terminal 212 and the emulation voltage Vrpl.

The load 300 includes the inductor "L", a plurality of resistors R1, R2, and ESR, a capacitor "C", and a constant current source 310.

The inductor "L" is connected between the output terminal 210 of the DC-to-DC converter 200 and a load output terminal 301 and generates the inductor current IL.

The resistors R1 and R2 are connected in series between the load output terminal 301 and the ground VSS, and the feedback voltage Vfb is generated as a voltage of the load output terminal 301 is divided based on a division ratio of resistances of the resistors R1 and R2.

The resistor ESR and the capacitor "C" are connected in series between the load output terminal 301 and the ground VSS.

The constant current source 310 is connected between the load output terminal 301 and the ground VSS and generates an output current (alternatively referred to as a "load current") Iload.

A pulse control signal generation circuit includes the first comparator 226 and the SR latch 228.

The first comparator 226 receives and compares a level of a first reference voltage Vref input to a first input terminal (e.g., a non-inverting input terminal) and a level of the first voltage Vsum input to a second input terminal (e.g., an inverting input terminal). When the level of the first reference voltage Vref is equal to or higher than the level of the first voltage Vsum, the first comparator 226 generates a first comparison voltage Vcomp having the high level; when the level of the first reference voltage Vref is lower than the level of the first voltage Vsum, the first comparator 226 generates the first comparison voltage Vcomp having the low level.

The SR latch 228 may control the on-time duration of each of (or alternatively, at least one of) the first pulse control signal HSCLK and the second pulse control signal LSCLK in response to the first comparison voltage Vcomp and an on-time control signal ON_TIME. For example, the first pulse control signal HSCLK and the second pulse control signal LSCLK may be complementary signals.

The SR latch 228 includes a set input "S" receiving the first comparison voltage Vcomp, a reset input "R" receiving the on-time control signal ON_TIME, an output terminal "Q" outputting the first pulse control signal HSCLK, and an inverse or complement output terminal QB outputting the second pulse control signal LSCLK.

The on-time control circuit 230 determines the on-time Ton during which the first power transistor 204 supplies the inductor current IL (or being an energizing time of the first power transistor 204). In detail, the on-time Ton means the high level duration of the first pulse control signal HSCLK or the on-time duration of the first power transistor 204.

The on-time control circuit 230 may adaptively adjust the on-time Ton for the purpose of minimizing or reducing the switching loss and the ripple in respective modes DCM_MODE, BCD_MODE, and CCM_MODE, and thus, the output current Iload may be optimized or improved. The on-time control circuit 230 may increase the on-time Ton when the level of the output current Iload become higher. Accordingly, when the on-time Ton increases, a switching frequency of the first power transistor 204 decreases, and thus, the switching loss decreases.

Figure 2:
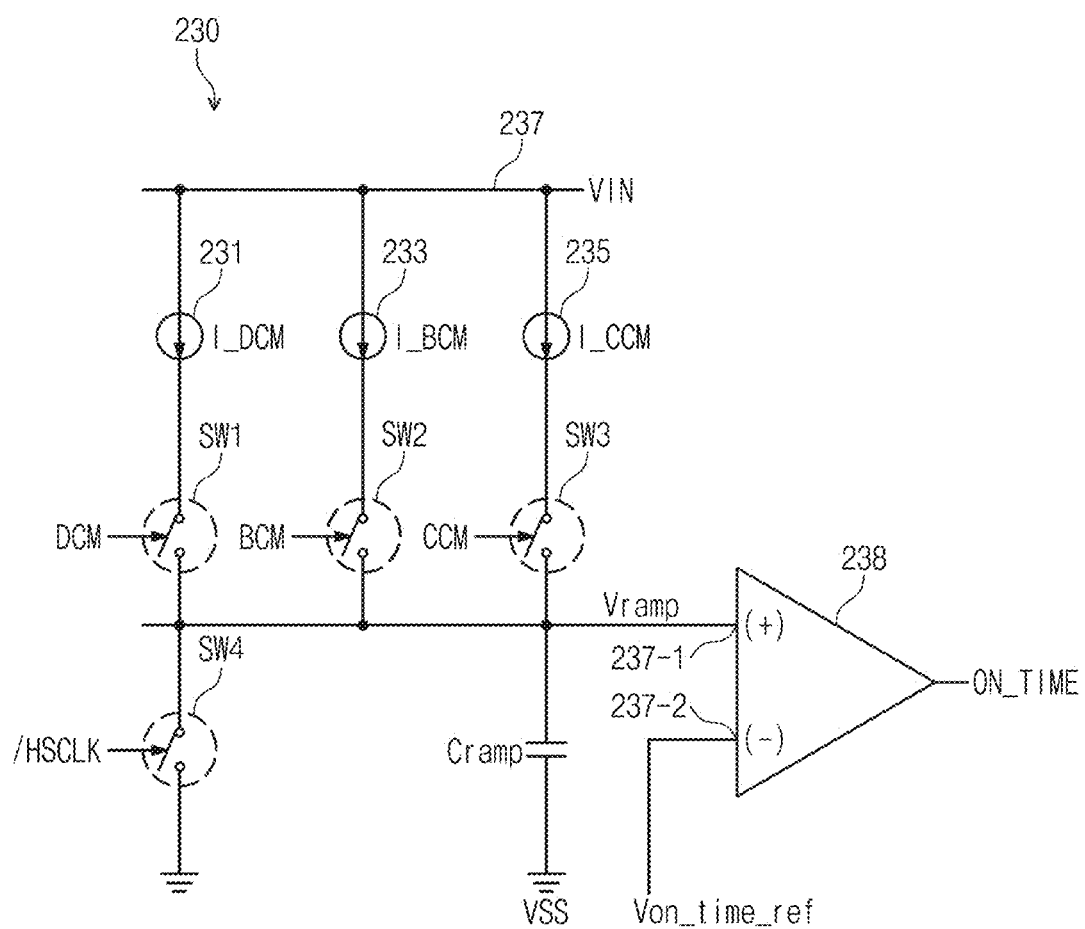
FIG. 2 is a circuit diagram of an on-time control circuit illustrated in FIG. 1.

FIG. 2 is a circuit diagram of an on-time control circuit illustrated in FIG. 1.

Referring to FIG. 2, the on-time control circuit 230 includes constant current sources 231, 233, and 235, switches SW1, SW2, SW3, and SW4, a capacitor having a capacitance Cramp, and a comparator 238.

A first current supply circuit supplies a first constant current I_DCM to a first input terminal 237-1 of the comparator 238 in response to a first mode control signal DCM. The first current supply circuit includes the first constant current source 231 and the first switch SW1, and the first constant current source 231 and the first switch SW1 are connected in series between a power line 237 supplying the DC voltage VIN and the first input terminal 237-1 of the comparator 238.

The first constant current source 231 generates the first constant current I_DCM, and the first switch SW1 supplies the first constant current I_DCM to the first input terminal 237-1 in response to the first mode control signal DCM.

A second current supply circuit supplies a second constant current I_BCM to the first input terminal 237-1 of the comparator 238 in response to a second mode control signal BCM. The second current supply circuit includes the second constant current source 233 and the second switch SW2, and the second constant current source 233 and the second switch SW2 are connected in series between the power line 237 supplying the DC voltage YIN and the first input terminal 237-1 of the comparator 238.

The second constant current source 233 generates the second constant current I_BCM, and the second switch SW2 supplies the second constant current I_BCM to the first input terminal 237-1 in response to the second mode control signal BCM.

A third current supply circuit supplies a third constant current I_CCM to the first input terminal 237-1 of the comparator 238 in response to a third mode control signal CCM, that is, the pulse skip mode control signal. The third current supply circuit includes the third constant current source 235 and the third switch SW3, and the third constant current source 235 and the third switch SW3 are connected in series between the power line 237 supplying the DC voltage VIN and the first input terminal 237-1 of the comparator 238.

The third constant current source 235 generates the third constant current I_CCM, and the third switch SW3 supplies the third constant current I_CCM to the first input terminal 237-1 in response to the third mode control signal CCM.

The second constant current I_BCM is smaller in amount in the third constant current I_CCM, and the third constant current I_CCM is smaller in amount than the first constant current I_DCM. That is, I_BCM<I_CCM<I_DCM.

The fourth switch SW4 is connected between the first input terminal 237-1 and the ground VSS and is turned on when the first pulse control signal HSCLK is at the low level.

The capacitor having the capacitance Cramp is connected between the first input terminal 237-1 and the ground VSS, is charged when the fourth switch SW4 is turned off, and is discharged when the fourth switch SW4 is turned on.

The comparator 238 receives and compares a level of a voltage Vramp supplied to the first input terminal 237-1 and a level of a second reference voltage Von_time_ref supplied to a second input terminal 237-2. The comparator 238 generates the on-time control signal ON_TIME having the high level when the level of the voltage Vramp is equal to or higher than the level of the second reference voltage Von_time_ref and generates the on-time control signal ON_TIME having the low level when the level of the voltage Vramp is smaller than the level of the second reference voltage Von_time_ref. For example, the first input terminal 237-1 is a non-inverting input terminal, and the second input terminal 237-2 is an inverting input terminal.

Figure 3A:
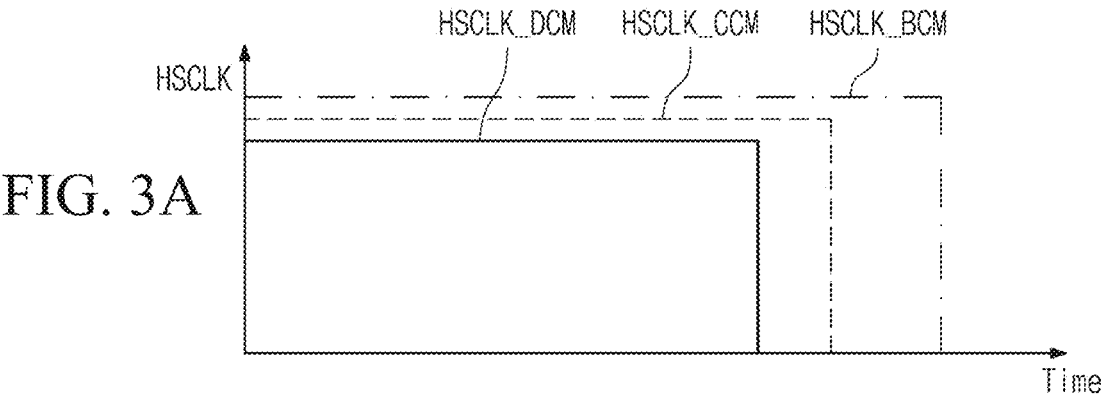
FIGS. 3A to 3C are timing diagrams of related signals for describing an operation of an on-time control circuit illustrated in FIG. 2.
Figure 3B:
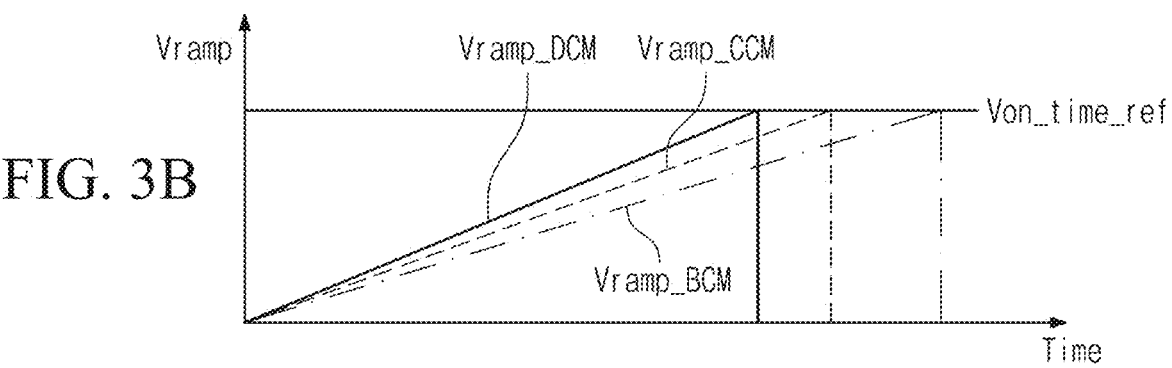
Figure 3C:
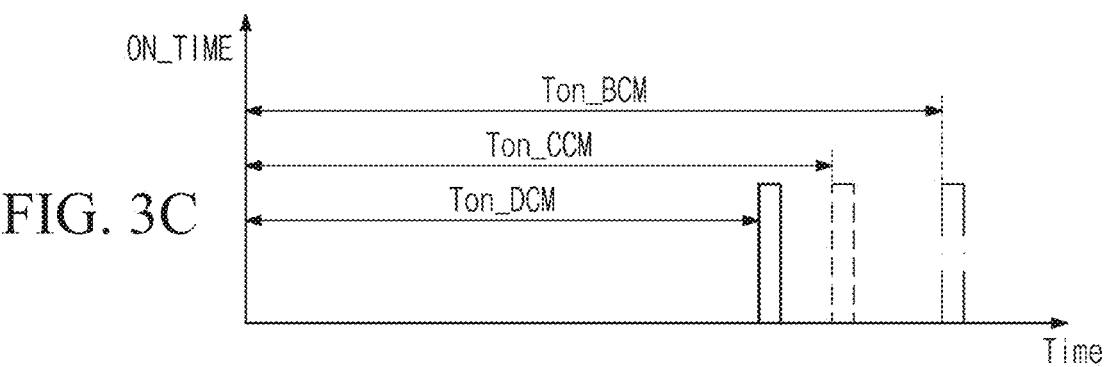

FIGS. 3A to 3C are timing diagrams of related signals for describing an operation of an on-time control circuit illustrated in FIG. 2.

Referring to FIG. 3A, HSCLK_DCM means the first pulse control signal HSCLK when the DC-to-DC converter 200 operates in a first mode; HSCLK_BCM means the first pulse control signal HSCLK when the DC-to-DC converter 200 operates in a second mode; HSCLK_CCM means the first pulse control signal HSCLK when the DC-to-DC converter 200 operates in a third mode.

Accordingly, the first pulse control signal HSCLK illustrated in FIG. 1 means one of HSCLK_DCM, HSCLK_BCM, and HSCLK_CCM, and the second pulse control signal LSCLK illustrated in FIG. 1 means an inverted version of the first pulse control signal HSCLK.

Referring to FIG. 3B, Vramp_DCM means the voltage Vramp when the DC-to-DC converter 200 operates in a first mode; Vramp_BCM means the voltage Vramp when the DC-to-DC converter 200 operates in a second mode; Vramp_CCM means the voltage Vramp when the DC-to-DC converter 200 operates in a third mode. Accordingly, Vramp means one of Vramp_DCM, Vramp_BCM, and Vramp_CCM.

Referring to FIG. 3C, Ton_DCM means the on-time Ton when the DC-to-DC converter 200 operates in the first mode; Ton_BCM means the on-time Ton when the DC-to-DC converter 200 operates in the second mode; Ton_CCM means the on-time Ton when the DC-to-DC converter 200 operates in the third mode. Accordingly, the on-time Ton illustrated in FIG. 1 means one of Ton_DCM, Ton_BCM, and Ton_CCM.

When I_BCM<I_CCM<I_DCM, Ton_BCM>Ton_CCM>Ton_DCM.

Each on-time Ton is determined by Equation 1 below.

[Equation 1]
$$\text{Ton\_DCM} = \frac{C_{ramp} \times V_{on\_time\_ref}}{I\_DCM}$$
$$\text{Ton\_BCM} = \frac{C_{ramp} \times V_{on\_time\_ref}}{I\_BCM}$$
$$\text{Ton\_CCM} = \frac{C_{ramp} \times V_{on\_time\_ref}}{I\_CCM}$$

Referring to FIGS. 1 and 3A to 3C, assuming that the third mode control signal CCM is at the high level and the on-time control signal ON_TIME is at the low level, the pulse skip control circuit 240 bypasses the second pulse control signal LSCLK to the second driver 206 regardless of the level of the output signal ZCS of the zero current sensor 250.

Because the first comparison voltage Vcomp is set to the high level when the level of the first reference voltage Vref is higher than the level of the first voltage Vsum, based on the first comparison voltage Vcomp of the high level input to the set input "S", the SR latch 228 outputs the first pulse control signal HSCLK of the high level to the first driver 202 and outputs the second pulse control signal LSCLK of the low level to the second driver 206.

Because the first driver 202 generates the first gate control signal HDRV of the high level in response to the first pulse control signal HSCLK of the high level and the second driver 206 generates the second gate control signal LDRV of the low level in response to the second pulse control signal LSCLK of the low level, the first power transistor 204 is turned on, and the second power transistor 208 maintains a turn-off state. Accordingly, the output voltage VIx of the output terminal 210 is increased by the first power transistor 204. In this case, the first voltage Vsum also increases.

Because the on-time control circuit 230 generates the on-time control signal ON_TIME transitioning to the high level after the on-time Ton, based on the on-time control signal ON_TIME of the high level input to the reset input "R", the SR latch 228 outputs the first pulse control signal HSCLK of the low level to the first driver 202 and outputs the second pulse control signal LSCLK of the high level to the second driver 206.

Because the first driver 202 generates the first gate control signal HDRV of the low level in response to the first pulse control signal HSCLK of the low level and the second driver 206 generates the second gate control signal LDRV of the high level in response to the second pulse control signal LSCLK of the high level, the first power transistor 204 is turned off, and the second power transistor 208 is turned on. Accordingly, the output voltage Vix of the output terminal 210 is decreased by the second power transistor 208. That is, the first voltage Vsum also decreases.

As the first voltage Vsum decreases and the first voltage Vsum is smaller than the first reference voltage Vref, the level of the first comparison voltage Vcomp transitions to the high level. Accordingly, because only the first power transistor 204 of the power transistors 204 and 208 is turned on, the output voltage Vix of the output terminal 210 increases, and the first voltage Vsum also increases.

Afterwards, because the on-time control circuit 230 generates the on-time control signal ON_TIME transitioning to the high level after the on-time Ton, only the second power transistor 208 of the power transistors 204 and 208 is turned on. In this case, the output voltage Vix of the output terminal 210 decreases, and the first voltage Vsum also decreases.

As there are repeated the process in which the level of the first voltage Vsum decreases below the level of the first reference voltage Vref and the process in which the level of the first voltage Vsum increases above the level of the first reference voltage Vref, the DC-to-DC converter 200 may regulate the output voltage Vix.

As illustrated in FIG. 1, the pulse skip control circuit 240 includes a first AND gate 242 and a second AND gate 244.

The first AND gate 242 generates an output signal AO1 by performing an AND operation on the zero current detection signal ZCS and an inverted version of the third mode control signal CCM.

The second AND gate 244 generate the second pulse control signal LSCLK by performing an AND operation on an output signal of the inverse output terminal QB of the SR latch 228 and the output signal AO1 of the first AND gate 242 and outputs the second pulse control signal LSCLK to the second driver 206.

When the third mode control signal CCM is at the high level, the pulse skip control circuit 240 bypasses the second pulse control signal LSCLK to the second driver 206.

Also, when the third mode control signal CCM is at the low level, the zero current detection signal ZCS is at the low level, and the level of the first voltage Vsum is higher than the level of the first reference voltage Vref, the first pulse control signal HSCLK is at the low level, and the second pulse control signal LSCLK is at the high level. In this case, the second pulse control signal LSCLK of the high level is bypassed to the second driver 206.

However, in a state where the third mode control signal CCM is at the low level and the level of the first voltage Vsum is higher than the level of the first reference voltage Vref, when the zero current detection signal ZCS transitions from the low level to the high level, the pulse skip control circuit 240 prevents the second pulse control signal LSCLK of the high level from being output to the second driver 206.

As such, the power transistors 204 and 208 maintain the turn-off state until the level of the first voltage Vsum is lower than the level of the first reference voltage Vref. When the above conditions are satisfied, the DC-to-DC converter 200 performs the pulse skip operation in which all the power transistors 204 and 208 are turned off. Accordingly, an unnecessary switching operation by each of the power transistors 204 and 208 is prevented.

Figure 4:
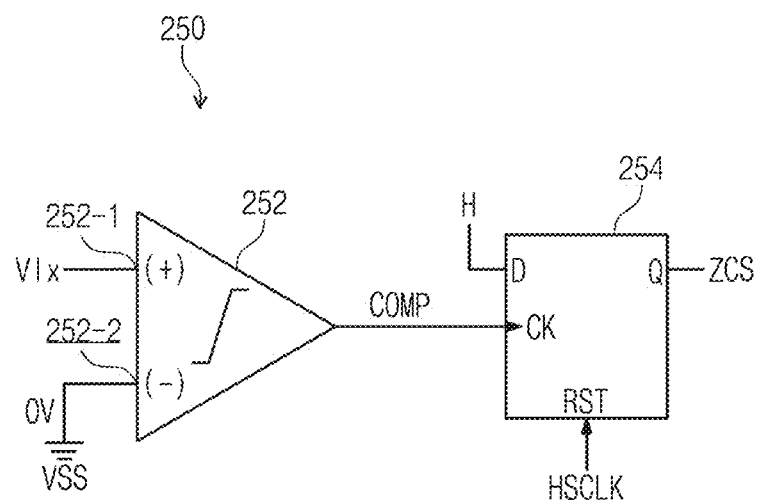
FIG. 4 is a circuit diagram of a zero current sensor illustrated in FIG. 1.

FIG. 4 is a circuit diagram of a zero current sensor illustrated in FIG. 1, and FIGS. 5A to 5E are timing diagrams of related signals for describing an operation of a zero current sensor illustrated in FIG. 4.

Figure 5A:
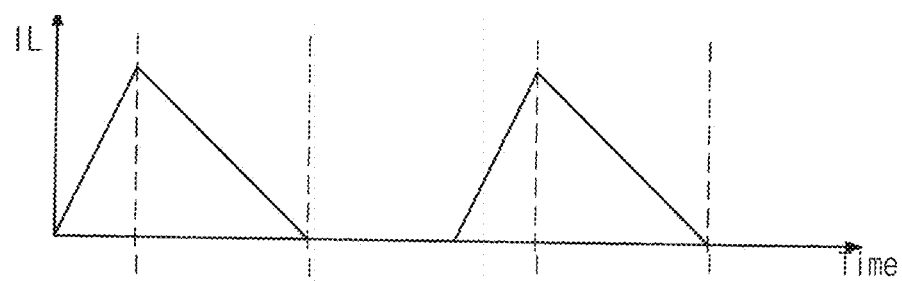
FIGS. 5A to 5E are timing diagrams of related signals for describing an operation of a zero current sensor illustrated in FIG. 4.
Figure 5B:
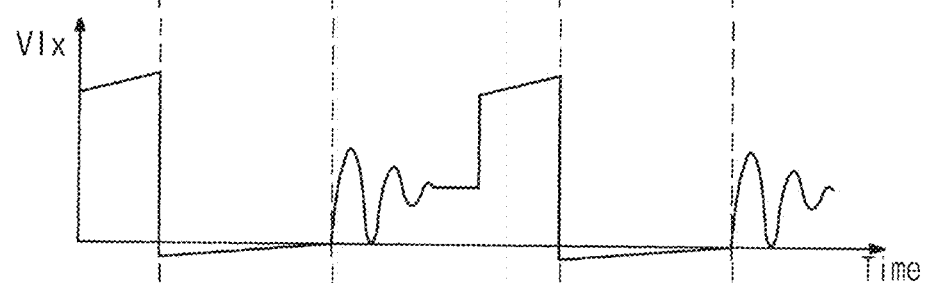

To perform the pulse skip operation, the zero current sensor 250 indirectly detects that the inductor current IL is a zero, by using the output voltage Vix, and generates the zero current detection signal ZCS of the high level when it is expected that the inductor current IL is a zero. FIG. 5A shows a waveform of the inductor current IL over time, and FIG. 5B shows a waveform of the output voltage Vix affected by the inductor current IL.

While the zero current detection signal ZCS maintains the high level to perform the pulse skip operation, the pulse skip control circuit 240 outputs the second pulse control signal LSCLK of the low level, and thus, the second power transistor 208 is turned off. As the second power transistor 208 is turned off, the inductor current IL is prevented from decreasing to 0 ampere (A) or less.

The zero current sensor 250 of FIG. 4 includes a comparator 252 and a D-flip-flop 254.

Figure 5C:
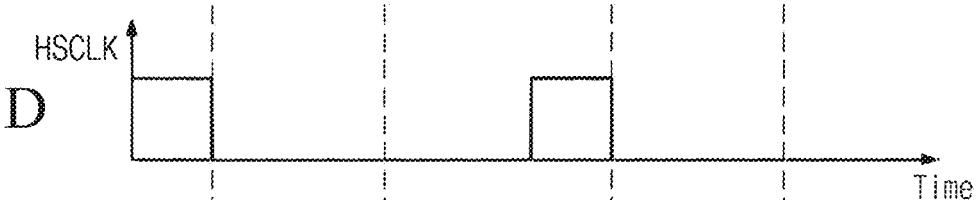

Referring to FIGS. 4 and 5C, the comparator 252 receives and compares the output voltage Vix input to a first input terminal 252-1 (e.g., a non-inverting input terminal) and a ground voltage input to a second input terminal 252-2 (e.g., an inverting input terminal). When a level of the output voltage Vix is equal to or higher than a level of the ground voltage, the comparator 252 outputs a comparison signal COMP of the high level to a clock terminal CK of the D-flip-flop 254; when the level of the output voltage Vix is lower than the level of the ground voltage, the comparator 252 outputs the comparison signal COMP of the low level to the clock terminal CK of the D-flip-flop 254.

Figure 5D:
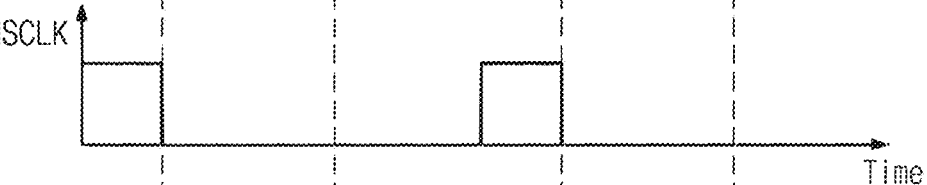
Figure 5E:
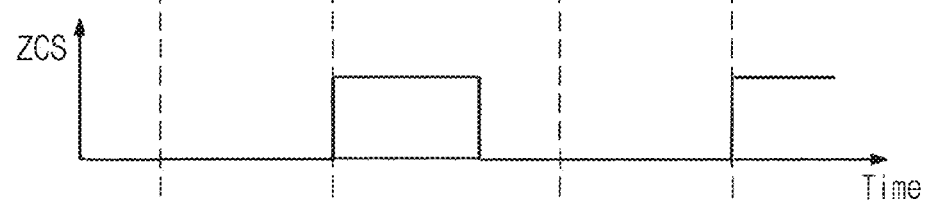

Referring to FIGS. 4, 5D, and 5E, the D-flip-flop 254 generates the zero current detection signal ZCS of the high level in response to the comparison signal COMP of the high level.

The D-flip-flop 254 includes an input terminal "D" receiving a voltage having the high level "H", an output terminal "Q" outputting the zero current detection signal ZCS, and a reset terminal RST receiving the first pulse control signal HSCLK. The zero current detection signal ZCS maintains the high level until the first pulse control signal HSCLK transitions from the low level to the high level. When the first pulse control signal HSCLK transitions from the low level to the high level, the D-flip-flop 254 is reset. That is, the zero current detection signal ZCS is set to the low level.

Figure 9:
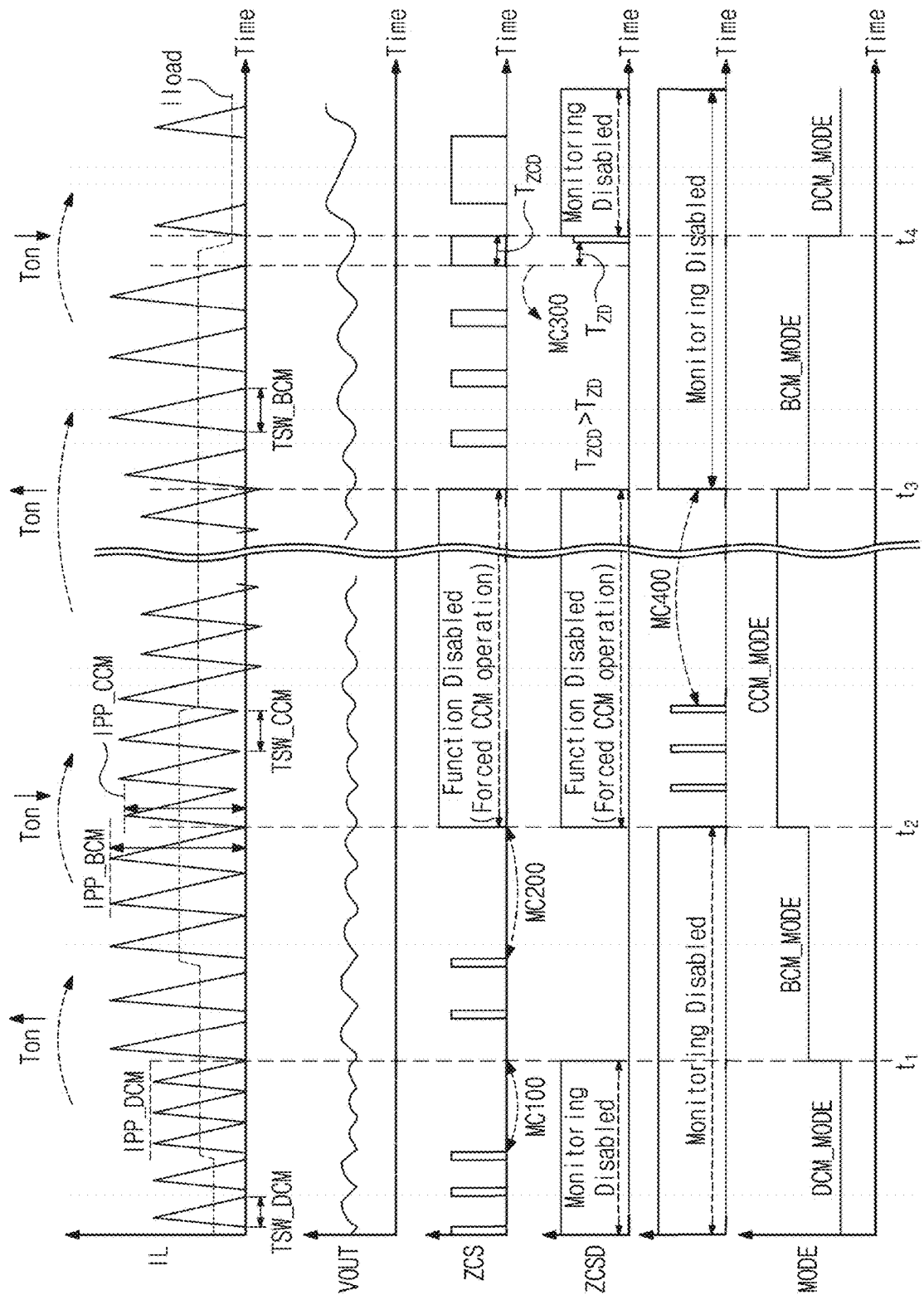
FIG. 9 is a waveform diagram of related signals for describing a pulse skip function and an on-time control function for each mode of a mode detector illustrated in FIG. 1.

As illustrated in FIG. 1, the de-glitch circuit 260 including a de-glitch delay Tzd removes a glitch included in the zero current detection signal ZCS and generates a de-glitch (or glitch-free) zero current detection signal ZCSD. Waveforms of the zero current detection signal ZCS and the de-glitch zero current detection signal ZCSD are illustrated in FIG. 9 as an example.

Figure 6:
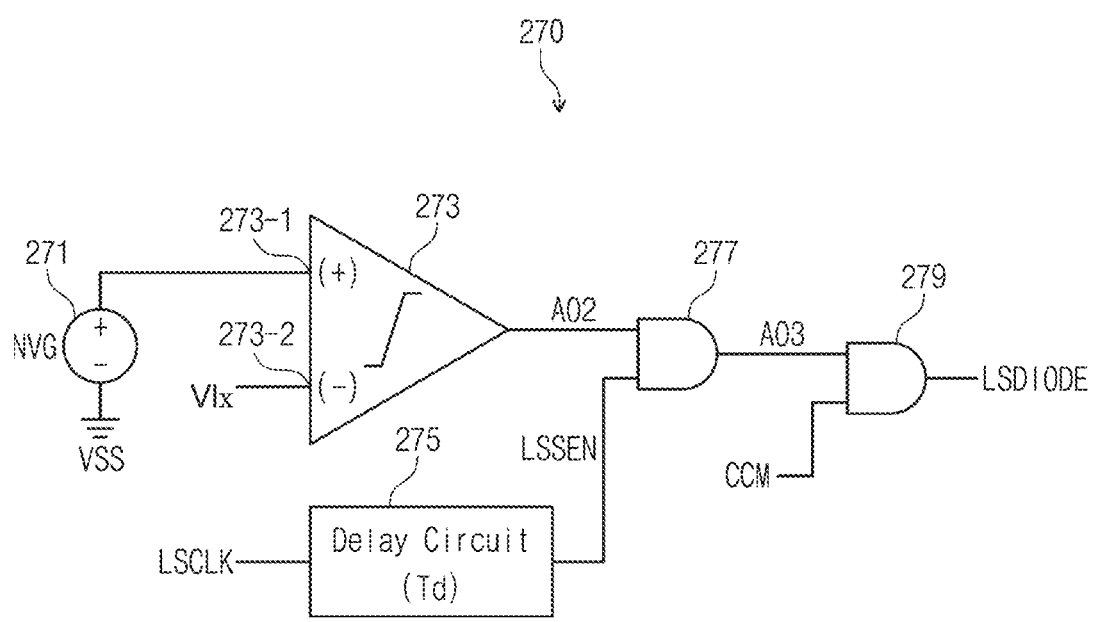
FIG. 6 is a circuit diagram of a second diode current detector illustrated in FIG. 1.
Figure 7:
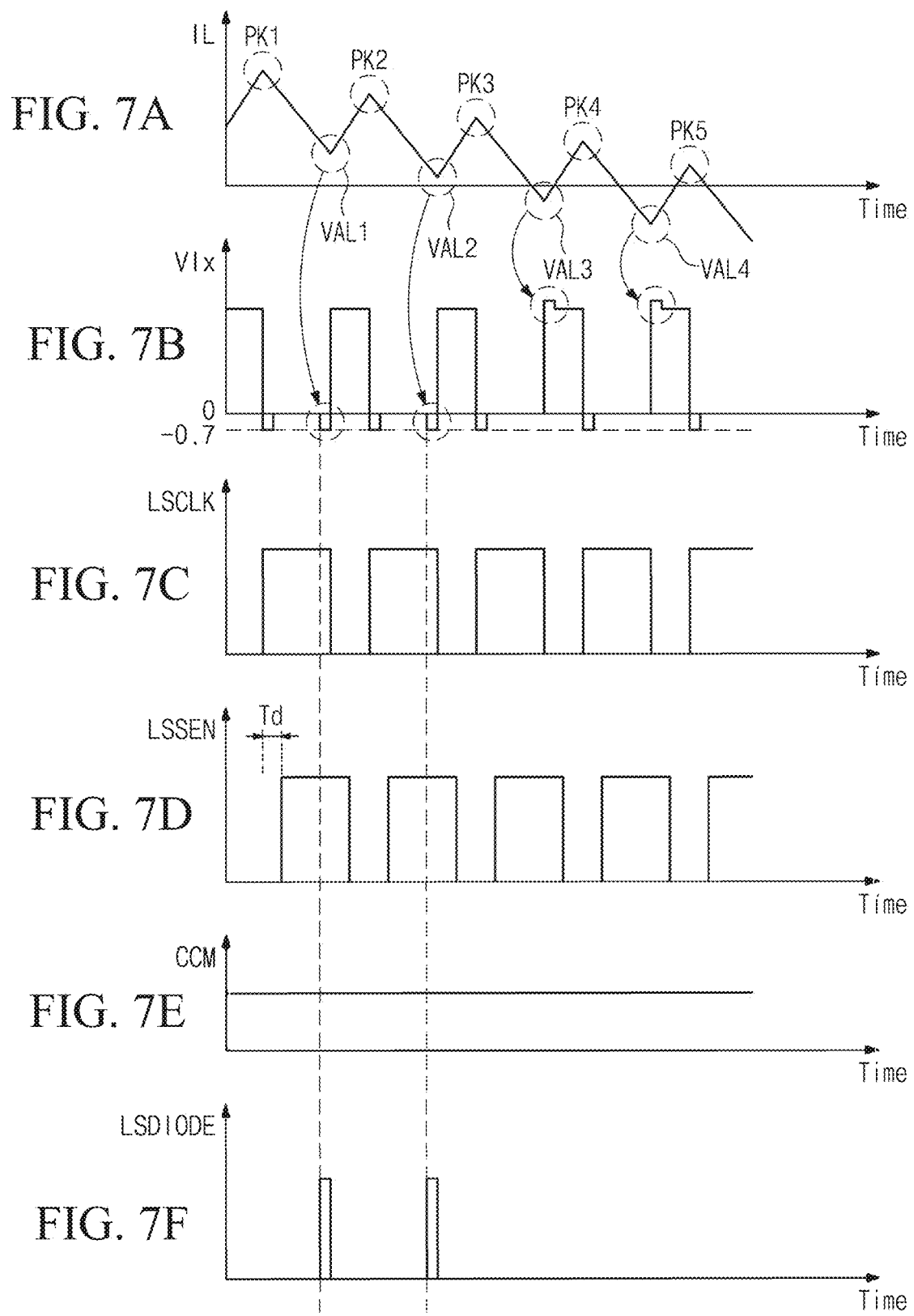
FIGS. 7A to 7F are timing diagrams of related signals for describing an operation of a second diode current detector illustrated detect FIG. 6.

FIG. 6 is a circuit diagram of a second diode current detector illustrated in FIG. 1, and FIGS. 7A to 7F are timing diagrams of related signals for describing an operation of a second diode current detector illustrated detect FIG. 6.

The second diode current detector 270 detects a level of the output voltage Vix immediately after the second power transistor 208 is turned off and indirectly determines whether a direction of a valley current of the inductor current IL is a positive (+) direction or a negative (−) direction, by using a detection result.

The second diode current detector 270 includes a negative power source 271, a comparator 273, a delay circuit 275, a first AND gate 277, and a second AND gate 279.

A voltage of the negative power source 271 is a negative voltage NVG (e.g., −0.3 V), and the comparator 273 receives and compares a level of the negative voltage NVG input to a first input terminal 273-1 (e.g., a non-inverting input terminal) and a level of the output voltage Vix input to a second input terminal 273-2 (e.g., an inverting input terminal). When the level of the negative voltage NVG is higher than the level of the output voltage Vix, the comparator 273 generates an output signal AO2 of the high level; when the level of the negative voltage NVG is lower than the level of the output voltage Vix, the comparator 273 generates the output signal AO2 of the low level.

The delay circuit 275 delays the second pulse control signal LSCLK as much as a delay time Td and generates a delay pulse control signal LSSEN.

The first AND gate 277 performs an AND operation on the output signal AO2 of the comparator 273 and the delay pulse control signal LSSEN.

The second AND gate 279 generates a voltage detection signal LSDIODE by performing an AND operation on an output signal AO3 of the first AND gate 277 and the third mode control signal CCM.

Referring to FIGS. 7A and 7B, when the inductor current IL is greater than 0 A at each of valleys VAL1 and VAL2, the inductor current IL free-wheels to the second diode LD, and thus, the output voltage Vix is decreased (or dropped) as much as a threshold voltage (e.g., 0.7 V) of the second diode LD.

However, when the inductor current IL is smaller than 0 A at each of valleys VAL3 and VAL4, the inductor current IL free-wheels to the first diode HD, and thus, the output voltage Vix is higher than the DC voltage VIN as much as the threshold voltage (e.g., 0.7 V) of the first diode HD.

To prevent the output voltage Vix from being dropped as much as the threshold voltage of each of (or alternatively, at least one of) the diodes HD and LD at each of (or alternatively, at least one of) peaks PK1 to PK5 of the inductor current IL, after the switching operation of the first power transistor 204 ends, during the delay time Td, the diode current detector 270 masks the detection of the current of the first diode HD to determine the direction of the inductor current IL at each of the valleys VAL1 and VAL2.

Figure 8:
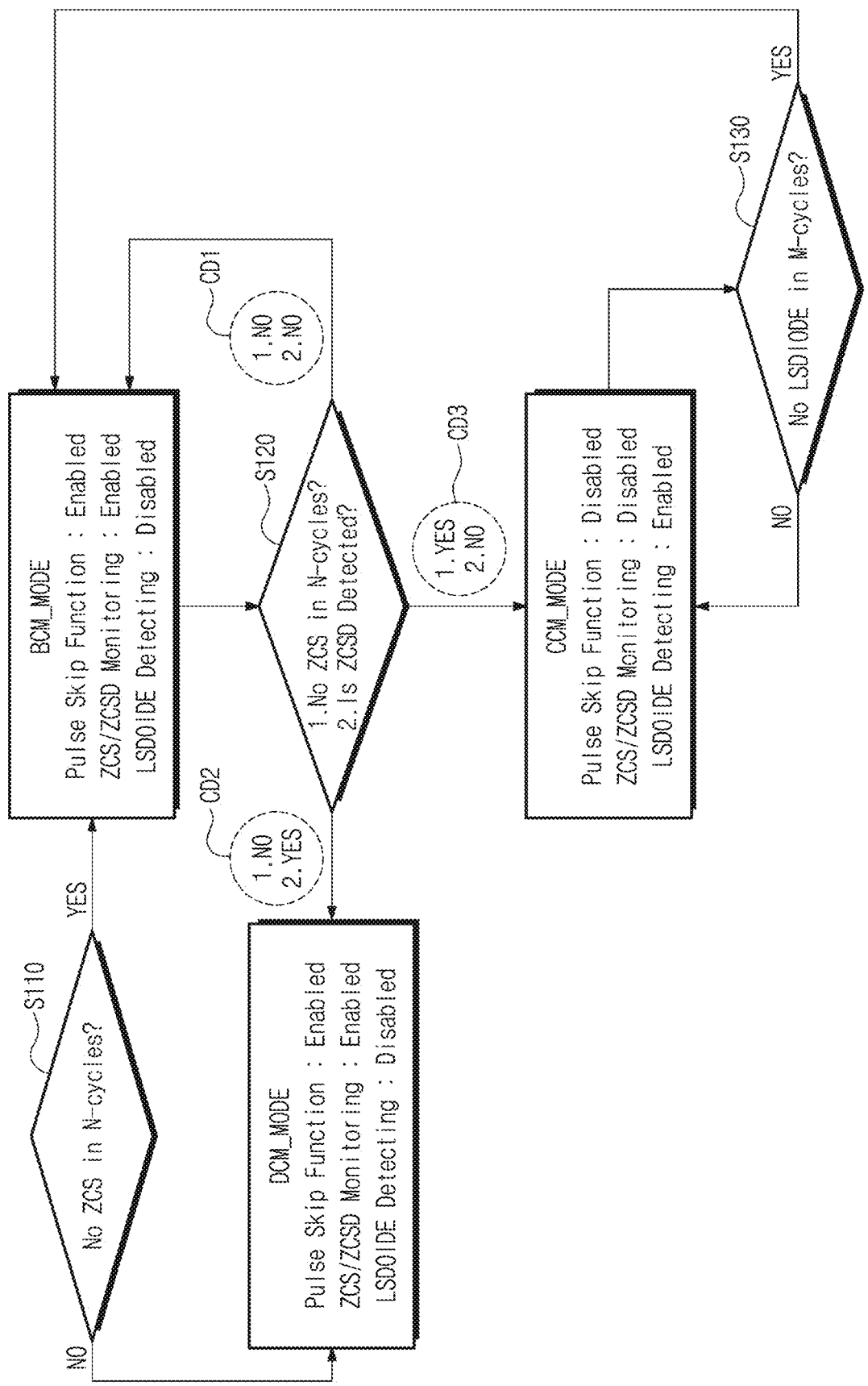
FIG. 8 is a flowchart for describing a pulse skip function and an on-time control function for each mode of a mode detector illustrated in FIG. 1.

FIG. 8 is a flowchart for describing a pulse skip function and an on-time control function for each mode of a mode detector illustrated in FIG. 1, and FIG. 9 is a waveform diagram of related signals for describing a pulse skip function and an on-time control function for each mode of a mode detector illustrated in FIG. 1.

An operation of the mode detector 280 will be described with reference to FIGS. 1 to 9.

In a first mode DCM_MODE called a light-load mode, the pulse skip function is enabled, a function of monitoring the zero current detection signal ZCS and the de-glitch zero current detection signal ZCSD is enabled, and a function of detecting the voltage detection signal LSDIODE is disabled.

In the first mode DCM_MODE, only the first mode control signal DCM is activated to the high level.

In a second mode BCM_MODE called a middle-load mode, the pulse skip function is enabled, the function of monitoring the zero current detection signal ZCS and the de-glitch zero current detection signal ZCSD is enabled, and the function of detecting the voltage detection signal LSDIODE is disabled. In the second mode BCM_MODE, only the second mode control signal BCM is activated to the high level.

In a third mode CCM_MODE called a heavy-load mode, the pulse skip function is disabled, the function of monitoring the zero current detection signal ZCS and the de-glitch zero current detection signal ZCSD is disabled, and the function of detecting the voltage detection signal LSDIODE is enabled. In the third mode CCM_MODE, that is, the pulse skip mode, only the third mode control signal CCM, that is, the pulse skip mode control signal is activated to the high level.

1. Switch from First Mode (DCM_MODE) to Second Mode (BCM_MODE)

In the first mode DCM_MODE, the output current Iload is indirectly determined through the zero current detection signal ZCS. Referring to a first time point $t_1$ of FIG. 9, when the zero current detection signal ZCS is not continuously generated during first reference (N) cycles or more (N being a natural number) (MC100), the mode detector 280 determines that the output current Iload is high, like Equation 2 below, and switches the mode of the mode detector 280 from the first mode DCM_MODE to the second mode BCM_MODE; the on-time control circuit 230 increases the on-time Ton for the purpose of reducing the switching loss of the first power transistor 204 in the second mode BCM_MODE.

$$Iload > \frac{IPP\_DCM}{2} \quad \text{[Equation 2]}$$

In Equation 2, the output current Iload is a current flowing through the constant current source 310, IPP_DCM represents a peak-to-peak current of the inductor current IL in the first mode DCM_MODE, and a cycle represents one period of the inductor current IL with a sawtooth waveform.

2. Switch from Second Mode (BCM_MODE) to First Mode (DCM_MODE)

Referring to FIG. 9, at a fourth time t4, when a pulse width Tzcd of the zero current detection signal ZCS is greater than the delay time Tzd of the de-glitch circuit 260 and the de-glitch zero current detection signal ZCSD of the high level is generated immediately after the delay time Tzd passes (MC300), the mode of the DC-to-DC converter 200 is switched from the second mode BCM_MODE to the first mode DCM_MODE.

In a steady state, when each of the power transistors 204 and 208 is not again switched during a time equal to or longer than a time corresponding to "TSW_BCM+Tzd", the mode detector 280 may determine that the output current Iload is low, like Equation 3 below. In Equation below, TWS_DCM represents one period of the inductor current IL with the sawtooth waveform in the first mode DCM_MODE, TWS_BCM represents one period of the inductor current IL with the sawtooth waveform in the second mode BCM_MODE, and TWS_CCM represents one period of the inductor current IL with the sawtooth waveform in the third mode CCM_MODE.

Accordingly, the DC-to-DC converter 200 may stably control the mode by securing a hysteresis between the modes BCM_MODE and DCM_MODE by using the de-glitch circuit 260 having the sufficient delay time Tzd. In this case, the on-time control circuit 230 performs an operation for decreasing the on-time Ton.

$$Iload < \frac{IPP\_BCM}{2} \times \frac{TSW\_BCM}{TSW\_BCM + Tzd} \quad \text{[Equation 3]}$$

In Equation 3 above, IPP_BCM represents a peak-to-peak current of the inductor current IL in the second mode BCM_MODE.

3. Switch from Second Mode (BCM_MODE) to Third Mode (CCM_MODE)

Referring to a second time point $t_2$ of FIG. 9, when the zero current detection signal ZCS is not continuously generated during the first reference (N) cycles or more (MC200), the mode detector 280 determines that the output current Iload is high, like Equation 4 below, switches the mode of the mode detector 280 from the second mode BCM_MODE to the third mode CCM_MODE, and releases the pulse skip function for improving a pulse load-transient characteristic. That is, the pulse skip mode control signal CCM is at the low level.

As the mode of the mode detector 280 is switched from the second mode BCM_MODE to the third mode CCM_MODE, the on-time control circuit 230 performs the operation of decreasing the on-time Ton.

$$Iload > \frac{IPP\_BCM}{2} \quad \text{[Equation 4]}$$

4. Switch from Third Mode (CCM_MODE) to Second Mode (BCM_MODE)

As the pulse skip function is released in the third mode CCM_MODE, the mode detector 280 does not monitor the zero current detection signal ZCS any longer. Even though the mode detector 280 does not monitor the zero current detection signal ZCS any longer, the diode current detector 270 indirectly determines the level of the output voltage Vix by monitoring the level of the output voltage Vix immediately after the second power transistor 208 is turned off.

When the voltage detection signal LSDIODE is at the high level, the mode detector 280 determines that the direction of the inductor current IL is a positive direction at each of the valleys VAL1 and VAL2.

Because it is determined that the output current Iload is higher than IPP_CCM/2, the mode detector 280 maintains the third mode CCM_MODE.

As illustrated in FIG. 9, at a third time point $t_3$, that is, when the voltage detection signal LSDIODE having the high level is not generated during second reference (M) cycles (M being a natural number) (MC400), the mode detector 280 determines that the output current Iload is high, like Equation 5 below, and switches the mode of the mode detector 280 from the third mode CCM_MODE to the second mode BCM_MODE.

$$Iload < \frac{IPP\_CCM}{2} \quad \text{[Equation 5]}$$

In Equation 5 above, IPP_CCM represents a peak-to-peak current of the inductor current IL in the third mode CCM_MODE.

Because an on-time Ton_BCM in the second mode BCM_MODE is longer than an on-time Ton_CCM in the third mode CCM_MODE, IPP_BCM is greater than IPP_CCM. Accordingly, the hysteresis may be secured between the modes CCM_MODE and BCM_MODE.

Referring again to FIGS. 8 and 9, while the mode detector 280 operates in the first mode DCM_MODE, when the zero current detection signal ZCS is not detected during the first reference (N) cycles (MC100) (i.e., when the zero current detection signal ZCS does not toggle during the first reference (N) cycles) (Yes in operation S110), the mode of the mode detector 280 is switched from the first mode DCM_MODE to the second mode BCM_MODE. The toggle means that a digital signal repeatedly has a low-to-high transition and a high-to-low transition (i.e., repeatedly has "1" and "0").

However, when the zero current detection signal ZCS toggles at least once during the first reference (N) cycles (NO in operation S110), the first mode DCM_MODE of the mode detector 280 is maintained.

While the mode detector 280 operates in the second mode BCM_MODE, when the zero current detection signal ZCS toggles at least once during the first reference (N) cycles and the de-glitch zero current detection signal ZCSD is not detected (CD1 in operation S120), the second mode BCM_MODE of the mode detector 280 is maintained.

While the mode detector 280 operates in the second mode BCM_MODE, when the zero current detection signal ZCS toggles at least once during the first reference (N) cycles and the de-glitch zero current detection signal ZCSD is detected (CD2 in operation S120), the mode of the mode detector 280 is switched from the second mode BCM_MODE to the first mode DCM_MODE.

While the mode detector 280 operates in the second mode BCM_MODE, when the zero current detection signal ZCS is not detected during the first reference (N) cycles and the de-glitch zero current detection signal ZCSD is not detected (CD3 in operation S120), the mode of the mode detector 280 is switched from the second mode BCM_MODE to the third mode CCM_MODE.

While the mode detector 280 operates in the third mode CCM_MODE, when the voltage detection signal LSDIODE is not detected during the second reference (M) cycles (YES in operation S130), the mode of the mode detector 280 is switched from the third mode CCM_MODE to the second mode BCM_MODE.

While the mode detector 280 operates in the third mode CCM_MODE, when the voltage detection signal LSDIODE is detected at least once during the second reference (M) cycles (NO in operation S130), the third mode CCM_MODE of the mode detector 280 is maintained.

FIGS. 10A to 10D are waveform diagrams of related signals according to whether a pulse skip control circuit illustrated in FIG. 1 is present or absent.

Referring to FIGS. 1 and 10A to 10D, because the first comparator 226 is an analog comparator, due to a delay of the first comparator 226, an offset occurs in the first comparator 226.

Figure 10A:
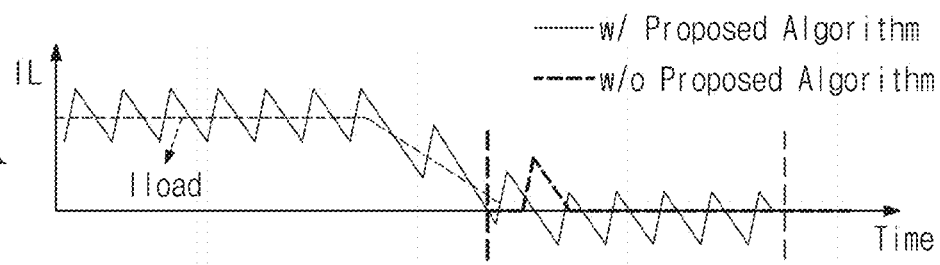
FIGS. 10A to 10D are waveform diagrams of related signals according to whether a pulse skip control circuit illustrated in FIG. 1 is present or absent.
Figure 10B:
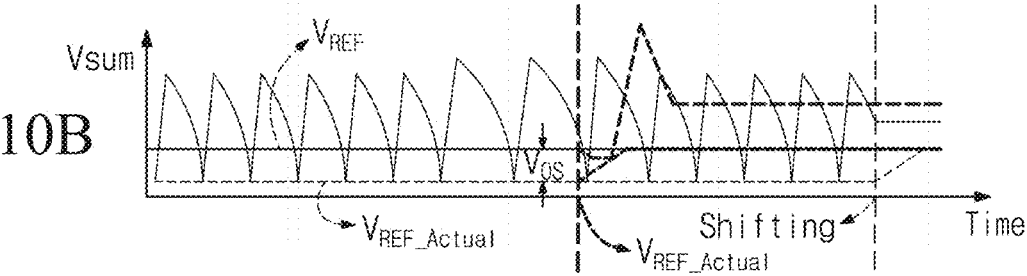

Accordingly, in an actual operation, the first comparator 226 operates as if comparing the first voltage Vsum and an actual reference voltage $V_{REF\_Actual}$ shifted as much as an offset voltage Vos, instead of the first reference voltage Vref (refer to FIG. 10B). In this case, because a slope of the feedback voltage Vfb changes along the output current Iload, as illustrated in FIG. 10B, an operation is performed as if the first reference voltage Vref changes along the load current Iload.

The change of the offset voltage Vos according to the output current Iload causes greater overshoot in a load-transient situation.

Figure 10C:
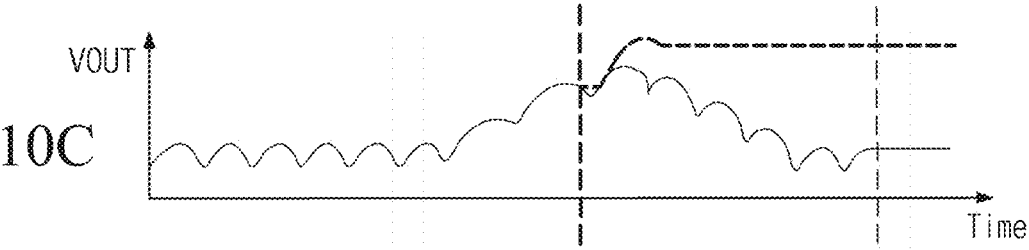
Figure 10D:
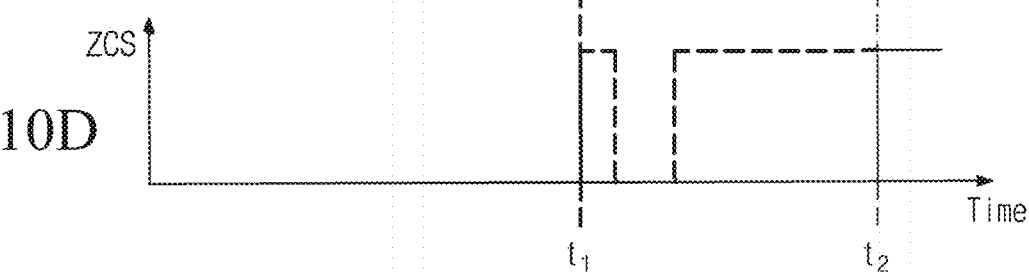

However, as the pulse skip function according to the present disclosure is used, as illustrated in FIG. 10C, the pulse skip control circuit 240 delays a time point at which the pulse skip operation starts, from a first time point $t_1$ to a second time point $t_2$. In this case, the first time point t1 is a time point at which the overshoot starts.

As the start time point of the pulse skip operation is delayed from the first time point $t_1$ to the second time point $t_2$, the actual reference voltage $V_{REF\_Actual}$ is shifted after the output voltage VOUT of the load 300 reaches an average voltage level, and thus, the overshoot decreases.

FIG. 11 is a block diagram illustrating an electronic device including a DC-to-DC converter providing a pulse skip function and an on-time control function, according to some example embodiments of the present disclosure. Referring to FIG. 11, an electronic device 400 includes a power source (or a DC voltage generator) 410, a PMIC 420, the load 300, and a device 430. Examples of the electronic device 400 are a mobile device and a personal computer (PC), but the present disclosure is not limited thereto.

The electronic device 400 may be a mobile device, a PC, an in-vehicle infotainment (IVI) system, or an in-car entertainment (ICE) system.

Examples of the power source 410 that generates a DC voltage PW are a battery or a voltage regulator. The DC voltage PW generated by the power source 410 may be used as the DC voltage VIN in the DC-to-DC converter 200.

The PMIC 420 includes the DC-to-DC converter 200 illustrated in FIG. 1, and the DC-to-DC converter 200 and the load 300 are connected through terminals 210 and 212.

The load 300 regulates the output voltage Vix of the DC-to-DC converter 200 to generate the load output voltage VOUT and supplies the load output voltage VOUT to the device 430.

The device 430 that is powered by the load output voltage VOUT may be a system on chip (SoC). The SoC 430 includes a memory device, a processor controlling an operation of the memory device, etc.

FIG. 12 is a block diagram illustrating an electronic device including a DC-to-DC converter providing a pulse skip function and an on-time control function, according to some example embodiments of the present disclosure.

An electronic device 500 includes a PMIC 510 including the DC-to-DC converter 200 illustrated in FIG. 1, the load 300, a memory controller 520, and a plurality of memory devices 531, 533, and 535 (memory device1 531, memory device2 533, and memory device3 535). The electronic device 500 may be an SSD for server or a memory module.

The DC-to-DC converter 200 uses the DC voltage PW received from the outside as the DC voltage VIN. The DC-to-DC converter 200 and the load 300 are connected through the terminals 210 and 212.

The load 300 regulates the output voltage Vix of the DC-to-DC converter 200 to generate the load output voltage VOUT and supplies the load output voltage VOUT to the plurality of memory devices 531, 533, and 535.

Each of the plurality of memory devices 531, 533, and 535 may be a volatile memory device or a nonvolatile memory device; the volatile memory device may be a dynamic random access memory (DRAM); the nonvolatile memory device may be a flash memory device.

According to some example embodiments of the present disclosure, a DC-to-DC converter and an electronic device including the same may decrease the overshoot by stabilizing a mode switch in a heavy-load-to-light-load transient situation through adaptive and stable pulse skip variable-control and may optimize or improve the efficiency and the ripple voltage according to the load current by variably adjusting an on-time of the DC-to-DC converter based on a result of indirectly monitoring the load current flowing to a load connected with the DC-to-DC converter.

Any of the elements and/or functional blocks disclosed above may include or be implemented in processing circuitry such as hardware including logic circuits; a hardware/software combination such as a processor executing software; or a combination thereof. For example, the memory controller 520 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. A DC-to-DC converter comprising:
   a first switching circuit connected between a power line receiving a DC voltage and an output terminal of the DC-to-DC converter, and the first switching circuit configured to be switched based on a first pulse control signal;
   a second switching circuit connected between the output terminal and a ground, and the second switching circuit configured to be switched based on a second pulse control signal;
   a pulse control signal generation circuit configured to,
      receive a first level of a first voltage associated with an output voltage of the output terminal and a second level of a first reference voltage,
      generate the first pulse control signal to increase the output voltage, in response to the second level of the first reference voltage being higher than the first level of the first voltage associated with the output voltage of the output terminal,
      generate the second pulse control signal to decrease the output voltage, in response to the second level of the first reference voltage being lower than the first level of the first voltage associated with the output voltage of the output terminal, and
      set a pulse skip mode control signal to a first mode, in response to a zero current detection signal not occurring within a reference cycle; and
   a pulse skip control circuit configured to selectively transfer the second pulse control signal to the second switching circuit based on the zero current detection signal and the pulse skip mode control signal such that the second pulse control signal is transferred to the second switching circuit to decrease the output voltage, in response the pulse skip mode control signal being set to the first mode, and
   wherein the first pulse control signal and the second pulse control signal are complementary signals.

2. The DC-to-DC converter of claim 1, wherein the pulse control signal generation circuit includes
   a first comparator configured to compare the first level and the second level and to output a first comparison voltage, and
   an SR latch including a set input terminal configured to receive the first comparison voltage, a reset input terminal configured to receive an on-time control signal for controlling a pulse width of the first pulse control signal, an output terminal configured to output the first pulse control signal, and an inverse output terminal configured to output the second pulse control signal.

3. The DC-to-DC converter of claim 2, further comprising:
   a second comparator including a first input terminal, a second input terminal configured to receive a second reference voltage, and an output terminal configured to generate the on-time control signal;
   a first current supply circuit configured to supply a first current to the first input terminal in response to a mode control signal;
   a second current supply circuit configured to supply a second current to the first input terminal in response to the pulse skip mode control signal; and
   a capacitor connected between the first input terminal and the ground,
   wherein an amount of the second current is more than or less than an amount of the first current.

4. The DC-to-DC converter of claim 1, wherein the pulse skip control circuit includes
   a first AND gate configured to receive the zero current detection signal and an inverted pulse skip mode control signal, and
   a second AND gate configured to determine whether to transfer the second pulse control signal to the second switching circuit, based on an inverted version of an output signal of the first AND gate.

5. The DC-to-DC converter of claim 4, further comprising:
   a zero current sensor configured to generate the zero current detection signal of a third level in response to a level of the output voltage being equal to or higher than a ground voltage and to generate the zero current detection signal of a fourth level in response to the first pulse control signal transitioning to the third level, the fourth level being lower than the third level.

6. The DC-to-DC converter of claim 4, further comprising:
   a first comparator configured to compare a level of the output voltage and a ground voltage; and
   a D-flip-flop including an input terminal configured to receive a voltage of a high level, a clock terminal connected with an output terminal of the first comparator, a reset terminal configured to receive the first pulse control signal, and an output terminal configured to output the zero current detection signal.

7. The DC-to-DC converter of claim 6, further comprising:
a de-glitch circuit configured generate a de-glitch zero current detection signal by delaying the zero current detection signal as much as a de-glitch delay time;
a second comparator configured to compare a level of a negative reference voltage and the level of the output voltage;
a delay circuit configured to delay the second pulse control signal;
a third AND gate configured to receive an output signal of the second comparator and an output signal of the delay circuit; and
a fourth AND gate configured to perform an AND operation on an output signal of the third AND gate and the pulse skip mode control signal to output a voltage detection signal.

8. The DC-to-DC converter of claim 7, wherein the pulse skip control circuit is configured to prevent the second pulse control signal from being transferred to the second switching circuit in response to the zero current detection signal of a third level, which is generated in response to the level of the output voltage being higher than the ground voltage and the pulse skip mode control signal of a fourth level, the fourth level being lower than the third level.

9. The DC-to-DC converter of claim 7, further comprising:
a mode detector configured to receive the zero current detection signal output from the D-flip flop, the de-glitch zero current detection signal output from the de-glitch circuit, and the voltage detection signal, and the mode detector configured to determine whether to activate the pulse skip mode control signal based on whether the zero current detection signal continues to toggle, a result of comparing a time corresponding to a pulse width of the zero current detection signal and the de-glitch delay time, and whether the voltage detection signal continues to toggle.

10. A power management integrated circuit comprising:
a semiconductor substrate; and
the DC-to-DC converter of claim 1 integrated on the semiconductor substrate.

11. An electronic device comprising:
a power management integrated circuit including a DC-to-DC converter including an output terminal and a feedback voltage terminal;
a load configured to filter an output voltage output from the output terminal and to generate a filtered voltage; and
a device configured to be powered by the filtered voltage,
wherein the DC-to-DC converter includes
a first switching circuit connected between a power line receiving a DC voltage and the output terminal, wherein the first switching circuit is configured to be switched based on a first pulse control signal;
a second switching circuit connected between the output terminal and a ground, wherein the second switching circuit is configured to be switched based on a second pulse control signal;
a pulse control signal generation circuit configured to, receive a first level of a first voltage associated with the output voltage and a second level of a first reference voltage,
generate the first pulse control signal to increase the output voltage, in response to the second level of the first reference voltage being higher than the first level of the first voltage associated with the output voltage of the output terminal, and
generate the second pulse control signal to decrease the output voltage, in response to the second level of the first reference voltage being lower than the first level of the first voltage associated with the output voltage of the output terminal, and
set a pulse skip mode control signal to a first mode, in response to a zero current detection signal not occurring within a reference cycle; and
a pulse skip control circuit configured to selectively transfer the second pulse control signal to the second switching circuit based on the zero current detection signal and the pulse skip mode control signal such that the second pulse control signal is transferred to the second switching circuit to decrease the output voltage, in response the pulse skip mode control signal being set to the first mode, and
wherein the first pulse control signal and the second pulse control signal are complementary signals.

12. The electronic device of claim 11, wherein the pulse control signal generation circuit includes
a first comparator configured to compare the first level and the second level and to output a first comparison voltage, and
an SR latch including a set input terminal configured to receive the first comparison voltage, a reset input terminal configured to receive an on-time control signal for controlling a pulse width of the first pulse control signal, an output terminal configured to output the first pulse control signal, and an inverse output terminal configured to output the second pulse control signal.

13. The electronic device of claim 12, wherein the DC-to-DC converter further comprises
an emulator configured to emulate an inductor current flowing through an inductor included in the load by using the output voltage and to generate an emulation voltage including a ripple, and
an adder circuit configured to generate the first voltage by adding a feedback voltage fed back from the load through the feedback voltage terminal and the emulation voltage.

14. The electronic device of claim 12, wherein the DC-to-DC converter further comprises
a second comparator including a first input terminal, a second input terminal receiving a second reference voltage, and an output terminal outputting the on-time control signal,
a first current supply circuit configured to supply a first current to the first input terminal in response to a mode control signal,
a second current supply circuit configured to supply a second current to the first input terminal in response to the pulse skip mode control signal, and
a capacitor connected between the first input terminal and the ground,
wherein an amount of the second current is more than or less than an amount of the first current.

15. The electronic device of claim 11, wherein the pulse skip control circuit includes
a first AND gate configured to receive the zero current detection signal and an inverted pulse skip mode control signal, and
a second AND gate configured to determine whether to transfer the second pulse control signal to the second switching circuit, based on an inverted version of an output signal of the first AND gate.

16. The electronic device of claim 15, wherein the DC-to-DC converter further comprises
a zero current sensor configured to generate the zero current detection signal of a third level in response to a level of the output voltage being equal to or higher than a ground voltage and to generate the zero current detection signal of a fourth level in response to the first pulse control signal transitioning to the third level, the fourth level being lower than the third level.

17. The electronic device of claim 11, further comprising:
a DC voltage generator configured to generate the DC voltage,
wherein the electronic device is a mobile device, and
wherein the device is a system on chip.

18. The electronic device of claim 11, further comprising:
a controller configured to control an operation of the device,
wherein the electronic device is a memory module, and
wherein the device is a volatile memory device or a nonvolatile memory device and the controller is a memory controller.

19. An operating method of a DC-to-DC converter which includes a first switching circuit connected between a power line receiving a DC voltage and an output terminal and switched based on a first pulse control signal and a second switching circuit connected between the output terminal and a ground and switched based on a second pulse control signal, the method comprising:
generating the first pulse control signal for increasing the output voltage, in response to a first voltage associated with an output voltage of the output terminal being smaller than a first reference voltage;
generating the second pulse control signal for decreasing the output voltage, in response to the first voltage being greater than the first reference voltage;
setting a pulse skip mode control signal to a first mode, in response to a zero current detection signal not occurring within a reference cycle; and
selectively transferring the second pulse control signal to the second switching circuit, based on the zero current detection signal and the pulse skip mode control signal such that the second pulse control signal is transferred to the second switching circuit to decrease the output voltage, in response the pulse skip mode control signal being set to the first mode,
wherein the first pulse control signal and the second pulse control signal are complementary signals.

20. The method of claim 19, wherein the determining whether to transfer the second pulse control signal to the second switching circuit includes
generating the zero current detection signal of a first level in response to the output voltage being equal to a ground voltage,
inverting the pulse skip mode control signal of a second level to generate the pulse skip mode control signal of the first level, the second level being lower than the first level,
generating a first AND signal by performing an AND operation on the zero current detection signal of the first level and the pulse skip mode control signal of the first level,
inverting the first AND signal to generate an inverted first AND signal, and
preventing the second pulse control signal from being transferred to the second switching circuit based on a result of performing an AND operation on the second pulse control signal and the inverted first AND signal.

* * * * *